US012106558B2

(12) United States Patent
Guicquero et al.

(10) Patent No.: US 12,106,558 B2
(45) Date of Patent: Oct. 1, 2024

(54) IMAGE PROCESSING FOR ON-CHIP INFERENCE

(71) Applicant: Commissariat à l'Energie Atomique et aux Energies Alternatives, Paris (FR)

(72) Inventors: William Guicquero, Grenoble (FR); Arnaud Verdant, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 373 days.

(21) Appl. No.: 17/659,784

(22) Filed: Apr. 19, 2022

(65) Prior Publication Data

US 2022/0351506 A1    Nov. 3, 2022

(30) Foreign Application Priority Data

Apr. 26, 2021    (FR) ..................................... 2104302

(51) Int. Cl.
  *G06V 10/98*    (2022.01)
  *H04N 23/73*    (2023.01)
(52) U.S. Cl.
  CPC ........... *G06V 10/993* (2022.01); *H04N 23/73* (2023.01)
(58) Field of Classification Search
  CPC ............................ G06V 10/993; H04N 23/73
  See application file for complete search history.

(56) References Cited

U.S. PATENT DOCUMENTS

| 8,059,174 | B2 | 11/2011 | Mann et al. |
| 9,549,125 | B1 | 1/2017 | Goyal et al. |
| 2011/0242334 | A1 | 10/2011 | Wilburn et al. |
| 2015/0324622 | A1 | 11/2015 | Meier et al. |
| 2019/0281203 | A1 | 9/2019 | Guicquero et al. |
| 2022/0121884 | A1* | 4/2022 | Zadeh .................... G06N 3/043 |

FOREIGN PATENT DOCUMENTS

| CN | 110619593 A | 12/2019 |
| EP | 2323361 A1 | 5/2011 |

OTHER PUBLICATIONS

Preliminary Search Report for French Application No. 2104302 dated Dec. 3, 2021, 2 pages.
Y. Wu et al., "Active Control of Camera Parameters for Object Detection Algorithms," arXiv:1705.05685, May 16, 2017, 7 pages.

* cited by examiner

*Primary Examiner* — Diane D Mizrahi
(74) *Attorney, Agent, or Firm* — Jordan IP Law, LLC

(57) ABSTRACT

The present disclosure relates to a method of performing, by an image processing circuit, an inference operation comprising: capturing first and second images using first and second values respectively of an image capture parameter; generating, for a first region of the first and second images, first and second estimates respectively of an image quality metric, wherein the image quality metric is dependent on the value of the image capture parameter; calculating first and second distances between the first and second estimates respectively and first and second target levels respectively; and supplying a result of the inference operation performed on the first region of either the first or second image selected based on the first and second distances.

15 Claims, 5 Drawing Sheets

IMAGE PROCESSING FOR ON-CHIP INFERENCE

FIELD

The present disclosure relates generally to the field of image sensors and methods of image processing, and in particular to a device and method for performing inference on captured images.

BACKGROUND

Image-based inference involves the use of captured images to deduce information regarding the environment captured in the image. For example, inference involves applying logical rules to input data, such as image data, in order to implement functions such as classification or regression on this data. Examples of applications of such inference techniques include object and/or event detection, including presence detection and/or movement detection, the detection or measurement of certain environmental parameters, etc. In some cases, the rules applied by the inference algorithm are learned using machine learning techniques, the inference algorithm for example being implemented by an artificial neural network.

A challenge for the implementation of such inference systems is that, for certain environments, the lighting conditions may vary significantly, for example at different times of the day or night, and under different meteorological conditions. As such, and particularly if there is no feedback mechanism to properly adapt the sensing scheme to the scene characteristics, the captured images may be of poor quality, leading to reduced effectiveness of the inference algorithm. In extreme cases, it may not be possible to perform inference at all.

There is thus a need for a method and device for performing image inference that is capable of correctly operating under a relatively broad range of lighting conditions.

SUMMARY

It is an aim of embodiments of the present disclosure to at least partially address one or more needs in the prior art.

According to one embodiment, there is provided a method of performing an inference operation comprising: capturing a first image using a first value of an image capture parameter; capturing a second image using a second value, lower than the first value, of the image capture parameter; generating, by an image processing circuit, for a first region of the first image, a first estimate of an image quality metric, wherein the image quality metric is dependent on the value of the image capture parameter; calculating, by the image processing circuit, a first distance between the first estimate and a first target level; generating, by the image processing circuit, for a first region of the second image, a second estimate of the image quality metric, wherein the first regions of the first and second images are spatially corresponding regions; calculating, by the image processing circuit, a second distance between the second estimate and a second target level; and supplying, by the image processing circuit, a result of the inference operation performed on the first region of either the first or second image selected based on the first and second distances.

According to one embodiment, the method further comprises: calculating, by the image processing circuit, a first new value of the image capture parameter based on at least the first estimate; capturing a third image using the first new value of the image capture parameter; calculating, by the image processing circuit, a second new value of the image capture parameter based on at least the second estimate; and capturing a fourth image using the second new value of the image capture parameter.

According to one embodiment, the first new value is further calculated based on the first target level, and the second new value is further calculated based on the second target level.

According to one embodiment, the method further comprises: performing the inference operation, by the image processing circuit, on the first region of the first image to generate a first inference result; and performing the inference operation, by the image processing circuit, on the first region of the second image to generate a second inference result, wherein supplying the result of the inference operation comprises selecting the first inference result or the second inference result based in the first and second distances.

According to one embodiment, the method further comprises: comparing, by the image processing circuit, the first and second distances; if the first distance is lower than the second distance, performing the inference operation on the first region of the first image to generate a first inference result, and supplying the first inference result as the result of the inference operation; and if the second distance is lower than the first distance, performing the inference operation on the first region of the second image to generate a second inference result, and supplying the second inference result as the result of the inference operation.

According to one embodiment, the method further comprises: generating, by the image processing circuit, for a second region of the first image, a third estimate of the image quality metric; calculating, by the image processing circuit, a further first distance between the third estimate and the first target level; generating, by the image processing circuit, for the second region of the first image, a fourth estimate of the image quality metric, wherein the second regions of the first and second images are spatially corresponding regions; calculating, by the image processing circuit, a further second distance between the fourth estimate and the second target level; and supplying, by the image processing circuit, a result of the inference operation performed on the second region of either the first or second image selected based on the first and second distances.

According to one embodiment, the first new value of the image capture parameter is based on a minimum of at least the first and third estimates, and the second new value of the image capture parameter is based on a maximum of at least the second and fourth estimates.

According to one embodiment, the image capture parameter is an exposure time.

According to one embodiment, the first and second estimates of the image quality metric are average pixel values of the pixels of the first region.

According to one embodiment, the result of the inference operation indicates a confidence level of a detection of an object in the first region.

According to one embodiment, the method further comprising comparing, by the image processing circuit, the result of the inference operation with a threshold value, and outputting the first and/or second image if the threshold value is exceeded.

According to a further aspect, there is provided an imaging device comprising: one or more image sensors configured to capture a first image using a first value of an image capture parameter and a second image using a second value, lower than the first value, of the image capture parameter; and an image processing circuit configured to: generate, for a first region of the first image, a first estimate of an image quality metric, wherein the image quality metric is dependent on the value of the image capture parameter; calculate a first distance between the first estimate and a first target level; generate, for a first region of the second image, a second estimate of the image quality metric, wherein the first regions of the first and second images are spatially corresponding regions; calculate a second distance between the second estimate and a second target level; and supply a result of the inference operation performed on the first region of either the first or second image selected based on the first and second distances.

According to one embodiment, the one or more image sensors and the image processing circuit are in a same integrated circuit chip.

According to one embodiment, the image processing circuit is further configured to: generate, for a second region of the first image, a third estimate of the image quality metric; calculate a further first distance between the third estimate and the first target level; generate, for the second region of the first image, a fourth estimate of the image quality metric, wherein the second regions of the first and second images are spatially corresponding regions; calculate a further second distance between the fourth estimate and the second target level; and supply a result of the inference operation performed on the second region of either the first or second image selected based on the first and second distances.

According to one embodiment, the image processing circuit is further configured to: calculate a first new value of the image capture parameter based on a minimum of at least the first and third estimates; capture a third image using the first new value of the image capture parameter; calculate a second new value of the image capture parameter based on a maximum of at least the second and fourth estimates; and capture a fourth image using the second new value of the image capture parameter.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures, or to an imaging device as orientated during normal use.

Unless specified otherwise, the expressions "around", "approximately", "substantially" and "in the order of" signify within 10%, and preferably within 5%.

The term "image capture parameter" is used to designate any of a broad range of parameters than may be set when an image is to be captured by an image sensor. These for example include:

- a parameter setting the exposure time, including the integration time of a photodiode, or other type of photosite, of each pixel and/or the opening time of a shutter, in order to reduce the effects of data quantization and noise by setting the dynamic range based on the scene;
- a parameter setting the focal plane, for example by adjusting the lens power and/or depth of field, in order to obtain a sharp image; and
- a parameter setting the gain, including the conversion gain of each pixel and the gain in the read out circuitry, which is for example at the bottom of the columns of the pixel array.

Figure 1:
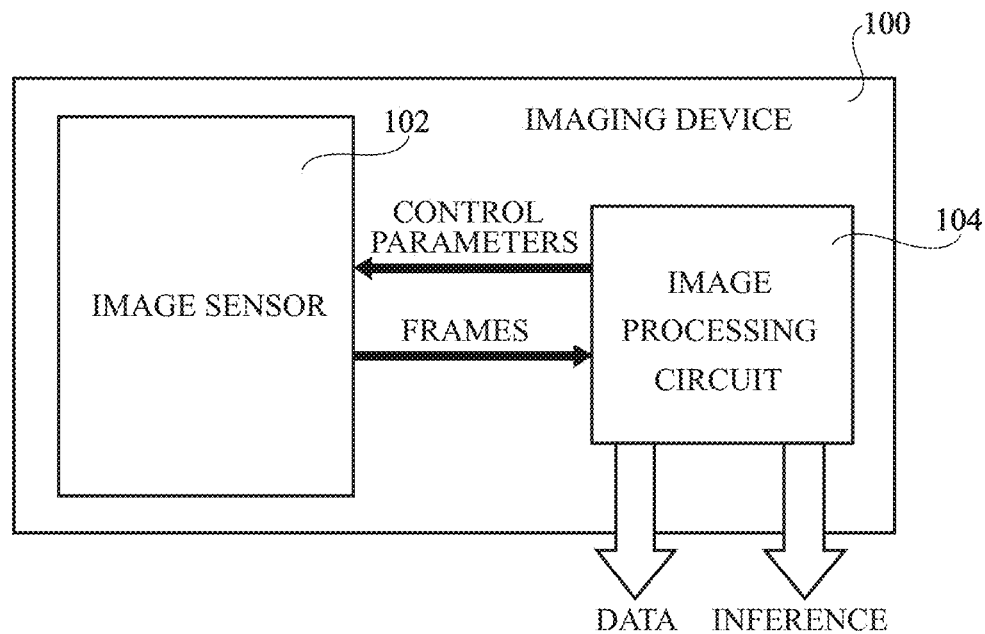
FIG. 1 schematically illustrates an imaging device according to an example embodiment of the present disclosure.

FIG. 1 schematically illustrates an imaging device (IMAGING DEVICE) 100 according to an example embodiment of the present disclosure. The device 100 for example comprises an image sensor (IMAGE SENSOR) 102 and an image processing circuit (IMAGE PROCESSING CIRCUIT) 104.

The image sensor 102 for example comprises an array of pixels, the array being formed on a focal plane of the image sensor 102. As known by those skilled in the art, light from the image scene is for example focused onto the image sensor 102 via an optical system (not illustrated), which may comprise lenses, filters, and/or other optical elements. The image sensor 102 is for example a CMOS sensor that is sensitive to visible light wavelengths, although in alternative embodiments the image sensor 102 could be of another type, including technologies sensitive to other light wavelengths, such as infrared.

The image processing circuit 104 is for example implemented by dedicated hardware. In some embodiments, the image processing circuit 104 is integrated in a same integrated circuit as the image sensor 102, although in alternative embodiments they could be implemented by separate chips. More generally, the imaging device 100 is for example a full custom CMOS System on Chip.

The image processing circuit 104 for example provides one or more image capture parameters (CONTROL PARAMETERS) to the image sensor 102 in order to control the image capture operation. The image processing circuit 104 receives, from the image sensor 102, image data, for example in the form of image frames (FRAMES), over a suitable communications interface.

The image processing circuit 104 is for example configured to output the image data in the form of a data signal (DATA). In some embodiments, prior to outputting the image data, one or more image processing operations are for example performed on the image data. For example, these image processing operations may involve filtering out noise from the raw image data provided by the image sensor 102, and/or other image processing adjustments.

Furthermore, the image processing circuit 104 is for example configured to perform an inference based on the image data in order to generate an inference result (INFERENCE). For example, this inference involves applying logical rules to the image data in order to implement functions such as classification or regression on this data. For example, the inference operation may include one or more of:
  object and/or event detection;
  presence detection and/or movement detection; and
  the detection and/or measurement of certain environmental conditions.

In some embodiments, the image processing circuit 104 has machine learning capabilities, and for example comprises an artificial neural network that has been trained to implement the inference algorithm. The use of artificial neural networks for performing inferences on image data is well known to those skilled in the art, and will not be described in detail here.

Figure 2:
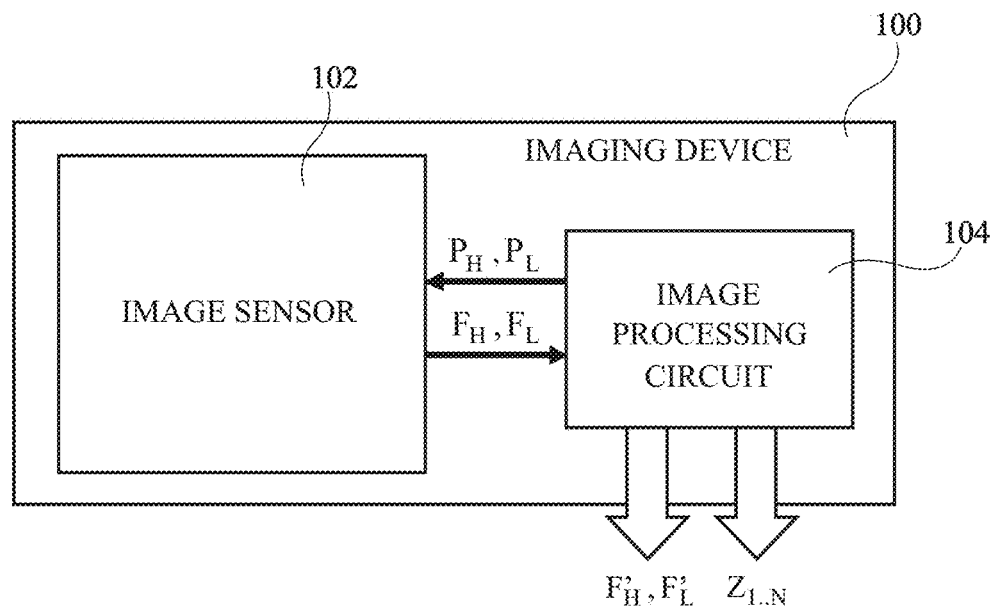
FIG. 2 schematically illustrates the imaging device of FIG. 1 in more detail according to an example embodiment.

FIG. 2 schematically illustrates the imaging device 100 of FIG. 1 in more detail according to an example embodiment.

As represented in FIG. 2, the image capture parameters provided by the image processing circuit 104 to the image sensor 102 for example include a pair of parameters $P_H$ and $P_L$. The parameters $P_H$ and $P_L$ are different from each other, and the value of the parameter $P_H$ is higher than the value of the parameter $P_L$.

The image sensor 102 for example provides two types of image data, a first type captured using the parameter $P_H$, for example in the form of image frames $F_H$, and a second type captured using the parameter $P_L$, for example in the form of image frames $F_L$. In some embodiments, single frames $F_H$ and $F_L$ are interlaced at the output of the image sensor 102, although in alternative embodiments there could an interlacing of bursts of two or more frames $F_H$ with bursts of two or more frames $F_H$.

In some embodiments, the image processing circuit 104 is configured to output one or all of the captured frames $F_H$ and/or $F_L$. In some cases, the image processing circuit 104 is configured to output frames $F_H'$ corresponding to the frames $F_H$ after some image processing, and frames $F_L'$ corresponding to the frames $F_L$ after some image processing. Alternatively, the raw image frames $F_H$ and/or $F_L$ are outputted by the image processing circuit 104.

The image processing circuit 104 is also configured to output a result Z of the inference. For example, an inference result Z is provided for each pair of frames $F_H$ and $F_L$ processed together, as described in more detail below. It would also be possible to output a result Z based on two or more successive frames $F_H$ and two or more successive frames $F_L$. Each result Z may be a single inference for the associated frames $F_H$ and $F_L$, or a set of inferences $Z_{1 \ldots N}$ for a plurality of regions $R_{1 \ldots N}$ of the associated frames $F_H$ and $F_L$.

According to the embodiments described herein, the inference result is based on a region of the frame $F_H$ or based on a corresponding region of the frame $F_L$, selected based on a distance calculation, as will now be described in more detail with reference to FIGS. 3 and 4.

Figure 3:
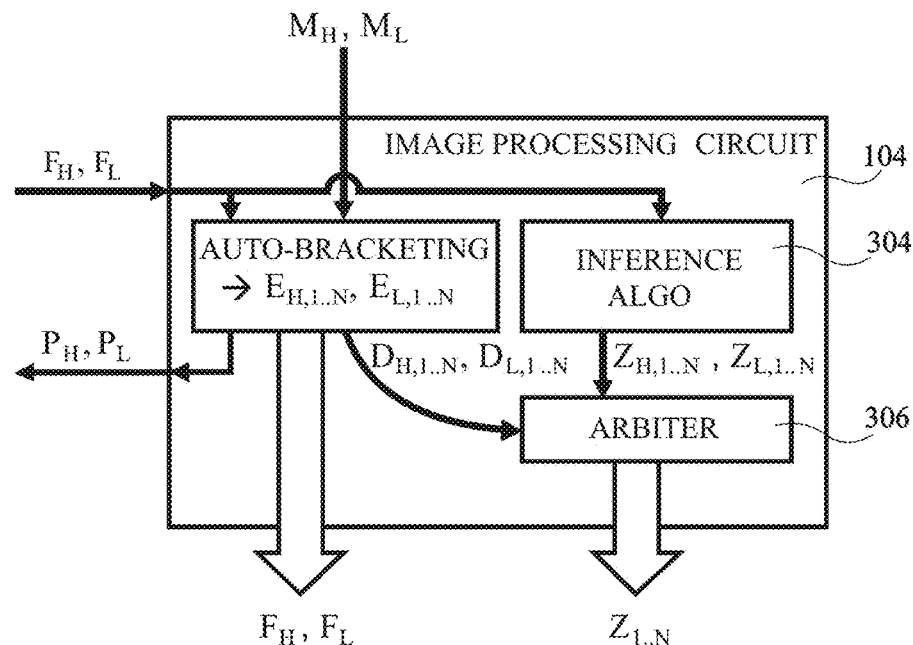
FIG. 3 schematically illustrates an image processing circuit of the imaging device of FIG. 2 in more detail according to an example embodiment of the present disclosure.

FIG. 3 schematically illustrates an image processing circuit 104 of the imaging device of FIG. 2 in more detail according to an example embodiment of the present disclosure.

Figure 4:
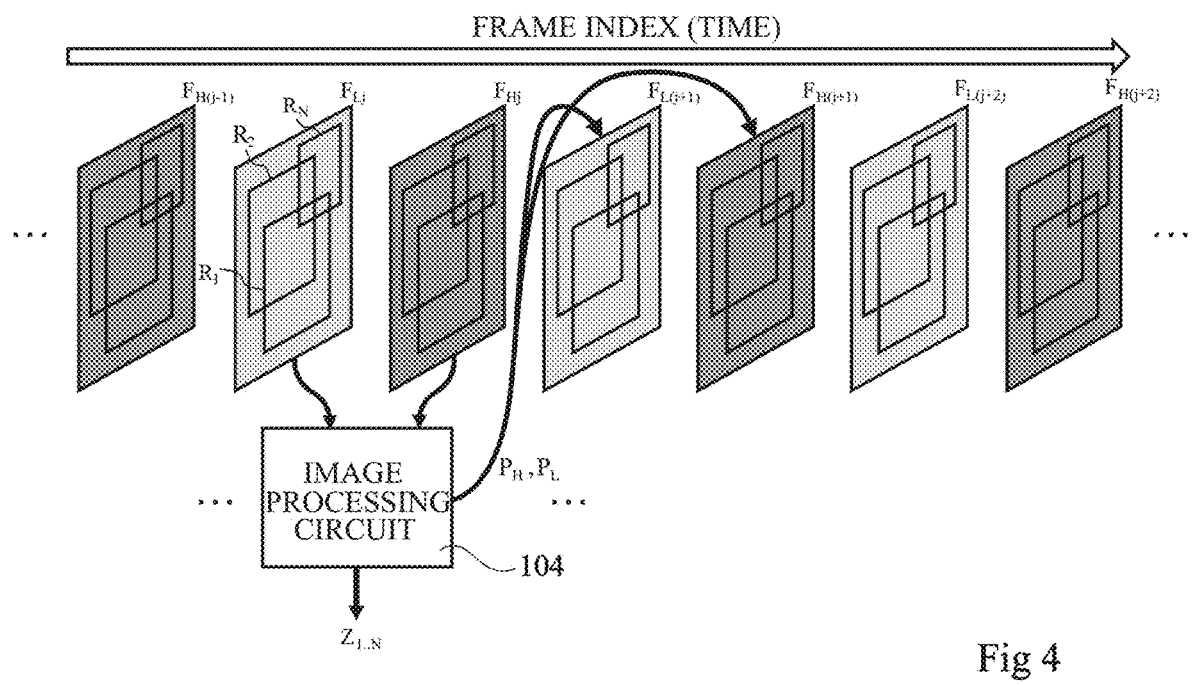
FIG. 4 illustrates a sequence of frames captured by an image sensor of the imaging device of FIG. 2 according to an example embodiment.

FIG. 4 illustrates a sequence of frames captured by the image sensor 102 of the imaging device 100 over a period of time, during which frame indexes of the frames for example increase (FRAME INDEX (TIME)). FIG. 4 illustrates in particular a sequence of seven frames $F_{H(j-1)}$, $F_{Lj}$, $F_{Hj}$, $F_{L(j+1)}$, $F_{H(j+1)}$, $F_{L(j+2)}$, and $F_{H(j+2)}$, where the pair of frames $F_{Lj}$ and $F_{Hj}$ is the pair of frames currently being processed.

With reference to FIG. 3, the imaging processing circuit 104 for example comprises an auto-bracketing module (AUTO-BRACKETING) 302, an inference algorithm 304, and an arbiter (ARBITER) 306.

The auto-bracketing module 302 for example receives the frames $F_H$ and $F_L$ captured by the image sensor 102, and also target levels $M_H$ and $M_L$ for an image quality metric of the frames $F_H$ and $F_L$ respectively. For example, as illustrated in FIG. 3, the image sensor 102 generates a stream of frames comprising an alternation of frames $F_H$ and $F_L$.

In some embodiments, each of the captured frames $F_H$, $F_L$ comprises one or more regions, corresponding to groups of pixels within the frames. In the example of FIG. 4, each frame comprises N regions, the regions $R_1$, $R_2$ and $R_N$ being illustrated. The regions are for example rectangular, although other shapes would be possible. Furthermore, in some cases, no two regions delimit exactly the same group of pixels, and/or the regions may overlap with each other. Furthermore, while not shown in FIG. 4, in some cases, all the pixels of a region may be a subset of those of another region. For example, one region may correspond to the entire frame, and other region may correspond to a subset of pixels of this frame. Each corresponding region is for example at an identical position within the frames for a given pair of frames $F_H$ and $F_L$ to be processed together. For example, in FIG. 4, the region $R_1$ delimits pixels at the same positions within the frames $F_{Hj}$ and $F_{Lj}$, which are to be processed together. More generally, a region $R_i$ within a pair of frames $F_H$ and $F_L$ to be processed together delimits pixels at the same positions within these frames. The positions of the regions are for example chosen in to permit certain operations to be applied to given regions of a scene. For example, it may be desired to detect an object that fills different areas of each frame depending on how close it is to the image sensor. In some cases, like in the example of FIG. 4, the regions are fixed for an entire sequence of frames. In alternative embodiments, the regions to vary from one pair of frames $F_H$ and $F_L$ to the next, the position of certain regions for example being adapted to track the movement of an object detected in the frames. The regions $R_{1 \ldots N}$ may be the result of any combination of sub-sampling, binning, pooling and/or cropping process. For example, in some embodiments, the regions $R_{1 \ldots N}$ may be the result of an integer under-sampling process of the captured frame with different shifts or pooling operations, such as mean, min, or max pooling, applied to generate each region.

Referring again to FIG. 3, the module 302 is for example configured to generate estimates $E_{H,1}$ to $E_{H,N}$ of the level of an image quality metric in each region $R_{1...N}$ of each frame $F_H$, and to generate estimates $E_{L,1}$ to $E_{L,N}$ of the level of the same image quality metric in each region $R_{1...N}$ of each frame $F_H$. The image quality metric is for example one that is dependent on the parameters $P_H$ and $P_L$ used to capture the frames $F_H$ and $F_L$. In other words, the selected values of the parameters $P_H$ and $P_L$ influence to some extent the level of image quality metric of the frames $F_H$ and $F_L$ respectively. For example, in the case that the parameters $P_H$ and $P_L$ are exposure times, estimates $E_{H,1...N}$ and $E_{L,1...N}$ of the image quality metric are for example average pixel levels in the regions $R_{1...N}$, the average for example being any type of average, such as, but not limited to, a mean value, median value, geometrical mean, or average of a tone-mapped image. Alternatively, in the case that the parameters $P_H$ and $P_L$ set the focal plane, the estimates of the image quality metric $E_{H,1...N}$ and $E_{L,1...N}$ are for example a measure of the image sharpness in the regions $R_{1...N}$. In the case that the parameters $P_H$ and $P_L$ set the gain, the estimates of the image quality metric $E_{H,1...N}$ and $E_{L,1...N}$ are for example the level of pixel saturation in the regions $R_{1...N}$.

In some embodiments, in the case that the regions $R_{1...N}$ have different areas from each other, the calculation of the image quality estimates $E_{H,1...N}$ and $E_{L,1...N}$ involves resizing the regions so that these estimates are all based on regions having the same size or resolution in terms of pixels, for example once processed.

In some embodiments, the image quality estimates $E_{H,1...N}$ and $E_{L,1...N}$ are related to frame statistics representing the dynamic range of the pixel values of the frames $F_H$ and $F_L$ calculated independently for each region $R_{1...N}$.

The image quality estimates $E_{H,1...N}$ and $E_{L,1...N}$ are for example used by the module 302 to adjust the parameters $P_H$ and $P_L$. The adjusted parameters are then for example provided to the image sensor 102 for use in the subsequent image capture operations. For example, with reference to FIG. 4, the updated parameters $P_H$ and $P_L$ generated based on the frames $F_{Hj}$ and $F_{Lj}$ are for example applied during the image capture operations of the subsequent frames $F_{L(j+1)}$ and $F_{H(j+1)}$.

The image quality estimates $E_{H,1...N}$ and $E_{L,1...N}$ are also for example used by the module 302 to calculate distances $D_{H,1}$ to $D_{H,N}$ between the image quality estimates $E_{H,1}$ to $E_{H,N}$ respectively and the target level $M_H$, and to calculate distances $D_{L,1}$ to $D_{L,A}$ between the image quality estimates $E_{L,1}$ to $E_{L,N}$ respectively and the target level $M_L$. For example, in one embodiment, the distances $D_{H,1}$ to $D_{H,N}$ are calculated using a function $dist_{H,i}(E_{H,i}, M_H)$ and the distances $D_{L,1}$ to $D_{L,N}$ are calculated using a function $dist_{L,i}(E_{L,i}, M_L)$. In some cases, the distance calculation functions are the same, in other words $dist_{H,i}(..., ...)=dist_{L,i}(..., ...)$. In one example, $D_{H,i}=[abs(E_{H,i}-M_H)]$, and $D_{L,i}=[abs(E_{L,i}-M_L)]$.

The inference algorithm 304 for example receives the frames $F_H$ and $F_L$ captured by the image sensor 102, and performs inferences on the regions of these frames to generate inference results Z. In the example of FIG. 3, the inference algorithm 304 performs inferences on the regions of all of the frames $F_H$ and $F_L$, and thus generates inference results $Z_{H,1}$ to $Z_{H,N}$ for each frame $F_H$, and inference results $Z_{L,1}$ to $Z_{L,N}$ for each frame $F_L$.

The distances $D_{H,1...N}$ and $D_{L,1...N}$ generated by the auto-bracketing module 302, and the inference results $Z_{H,1...N}$ and $Z_{L,1...N}$, are for example supplied to the arbiter 306. The arbiter 306 is for example configured to select, for each of the regions $R_{1...N}$, the inference result associated with the region having the lowest distance. In other words, for each region $R_i$, with i from 1 to N, the inference result $Z_{H,i}$ is chosen if $D_{H,i}<D_{L,i}$, and the inference result $Z_{L,i}$ is chosen if $D_{L,i} \leq D_{H,i}$.

The inference results chosen for each region form for example an output set of results $Z_{1...N}$ of the image processing circuit 104. Each inference result $Z_{1...N}$ is for example a scalar value, although depending on the inference operation, it could alternatively be a more complex result, such as a vector. In some embodiments, the inference operation is a classification operation, and the inference result is a confidence level in the given label, corresponding for example to the presence of an object in the given region R. For example, the inference algorithm has been trained such that when the result is positive for a given region, this signifies that an object or other characteristic has been found. Alternatively, rather than the inference operation being a classification operation, it could be a regression operation that estimates a quantity associated with the given region R. An example of such a regression operation would be specific object numbering.

In an alternative embodiment, rather than the inference algorithm 304 systematically calculating all of the inference results $Z_{H,1}$ to $Z_{H,N}$ for each frame $F_H$, and all of the inference results $Z_{L,1}$ to $Z_{L,N}$ for each frame $F_L$, the distances $D_{H,1...N}$ and $D_{L,1...N}$ could be supplied by the auto-bracketing module 302 to the inference algorithm 304, and the inference algorithm 304 is configured to compare the distance for each region, and to perform the inference only for the region having the lowest distance. In other words, for each region $R_i$, with i from 1 to N, the inference result $Z_{H,i}$ is calculated if $D_{H,i}<D_{L,i}$, and the inference result $Z_{L,i}$ is calculated if $D_{L,i} \leq D_{H,i}$. The inference result chosen for each region then for example forms, as before, the output set of results $Z_{1...N}$ of the image processing circuit 104. Thus, in this case, the arbiter 306 can be omitted.

Figure 5:
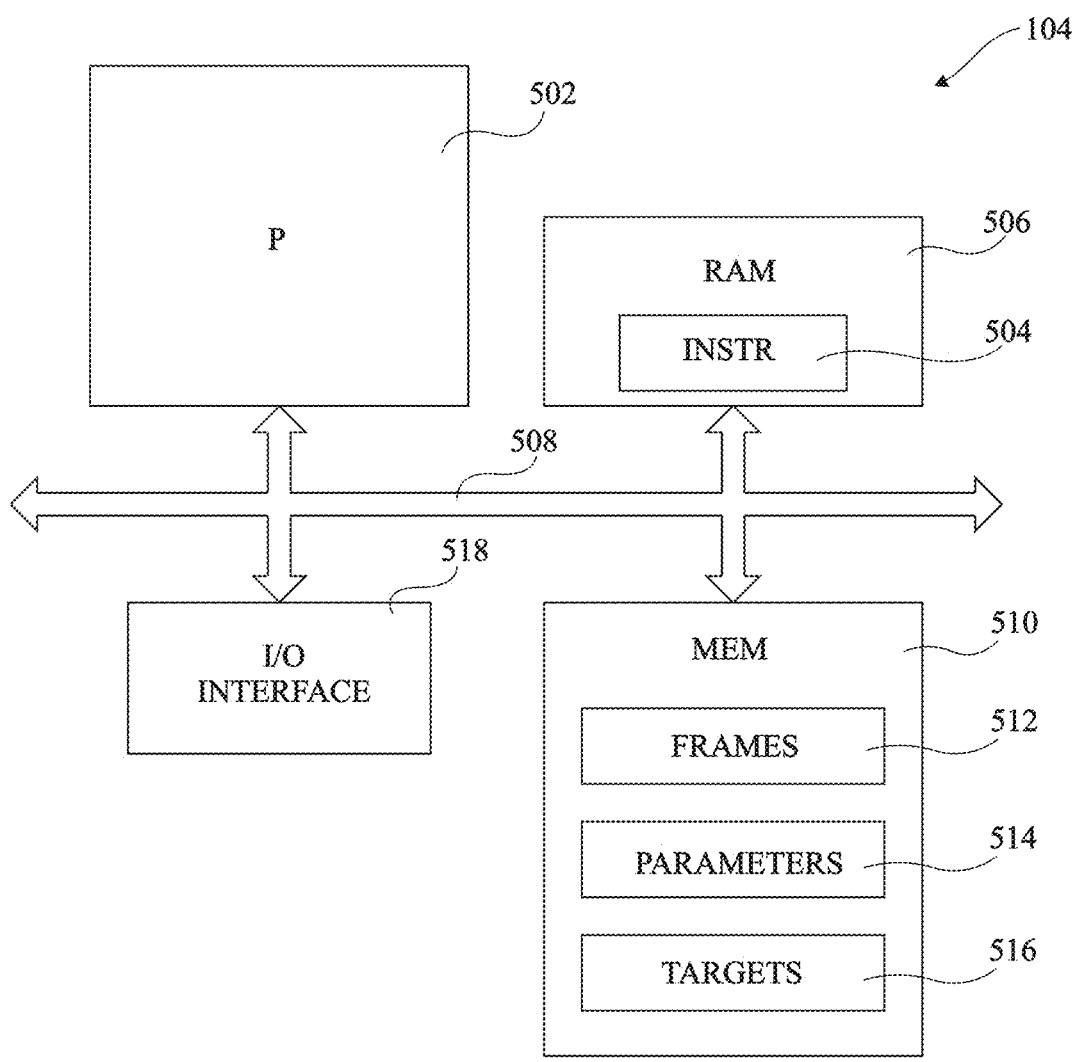
FIG. 5 schematically illustrates the image processing circuit of FIG. 2 in more detail according to an example in which the functions of this circuit are implemented in software.

FIG. 5 schematically illustrates the image processing circuit 104 in more detail according to an example in which the functions of this circuit are implemented in software executed by suitable hardware. The processing circuit 104 for example comprises a processing device (P) 502 comprising one or more processors under control of instructions (INSTR) 504 stored in an instruction memory (RAM) 506, which is for example a random-access memory. The processing device 502 and memory 506 are for example coupled via a bus 508. A further memory (MEM) 510 is also for example coupled to the bus 508, and for example stores, in a memory portion 512, frames (FRAMES) captured by the image sensor 102, the image capture parameters (PARAMETERS) 514 to be applied to the image sensor 102, and target values (TARGETS) 516 indicating the target image quality metrics.

An input/output interface (I/O INTERFACE) 518 is also for example coupled to the bus 508 and permits communication with other devices such as the image sensor 102 and other hardware of imaging device 100.

Rather than being implemented in software, it would also be possible that some or all of the functions of the image processing circuit 104 are implemented by one or more dedicated hardware circuits, such as by an ASIC (application specific integrated circuit) or by an FPGA (field-programmable gate array). In the case that the inference algorithm 304 is implemented by an artificial neural network, this network may be implemented in software, in other words by computing instructions and data stored in memories of the circuit 104, or at least partially by dedicated hardware.

Figure 6:
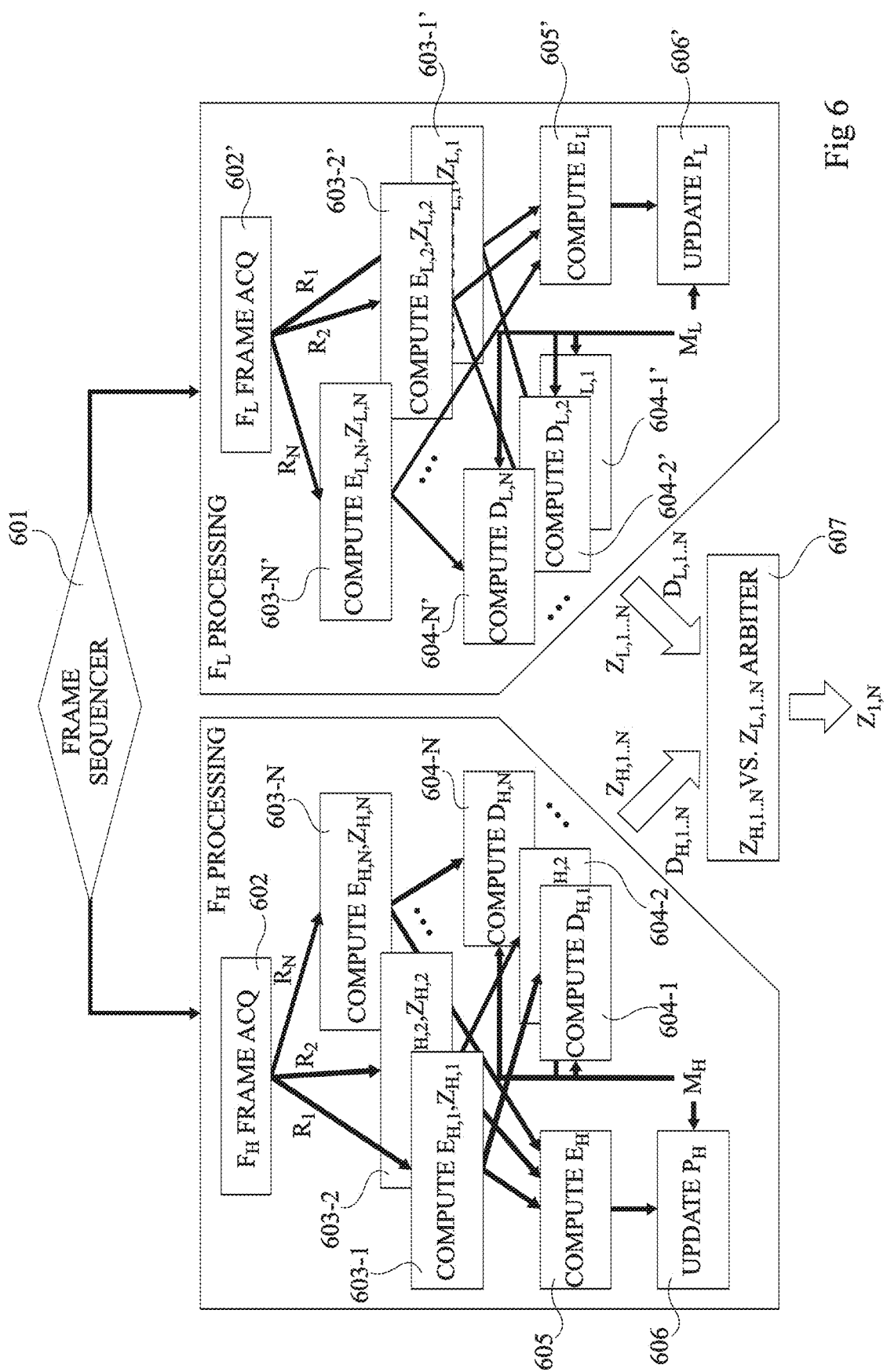
FIG. 6 is a flow diagram illustrating operations in a method of performing inference on image data according to an example embodiment of the present application.

FIG. 6 is a flow diagram illustrating operations in a method of performing inference on image data according to an example embodiment of the present application. This method for example implemented by the image processing circuit 103 of FIGS. 2 and/or 5.

A function 601 (FRAME SEQUENCER) involves controlling, by the image processing circuit 104, the image sensor 102 to generate interlaced frames $F_H$ and $F_L$ based on the image capture parameters $P_H$ and $P_L$ respectively. The frames $F_H$ are generated and processed by a set of operation 602 to 606 ($F_H$ PROCESSING) and the frames $F_L$ are generated and processed by a set of operation 602' to 606' ($F_L$ PROCESSING).

In the operation 602 ($F_H$ FRAME ACQ), a frame $F_H$ is acquired from the image sensor 102.

Similarly, in the operation 602' ($F_L$ FRAME ACQ), a frame $F_L$ is acquired from the image sensor 102.

In operations 603-1 to 603-N(COMPUTE), the estimations of the image quality metric $E_{H,1 \ldots N}$, and the inference values $Z_{H,1 \ldots N}$ are for example generated for the regions $R_{1 \ldots N}$ respectively of the frame $F_H$.

Similarly, in operations 603-1' to 603-N' (COMPUTE), the estimations of the image quality metric $E_{L,1 \ldots N}$, and the inference values $Z_{L,1 \ldots N}$ are for example generated for the regions $R_{1 \ldots N}$ respectively of the frame $F_L$.

In operations 604-1 to 604-N(COMPUTE), the distances $D_{H,1 \ldots N}$ between the estimated image quality metrics $E_{H,1 \ldots N}$ and the target level $M_H$ are for example computed.

Similarly, in operations 604-1' to 604-N' (COMPUTE), the distances $D_{L,1 \ldots N}$ between the estimated image quality metrics $E_{L,1 \ldots n}$ and the target level $M_L$ are for example computed.

In an operation 605 (COMPUTE), an image quality metric estimate $E_H$ for the frame $F_H$ is for example generated. In some embodiments, the image quality metric $E_H$ is selected as the lowest value among the estimates $E_{H,1 \ldots N}$.

Similarly, in an operation 605', an estimation of the image quality metric $E_L$ for the frame $F_L$ is generated. In some embodiments, the image quality metric $E_L$ is selected as the highest value among the estimates $E_{L,1 \ldots N}$.

In an operation 606 (UPDATE), the parameter $P_H$ is for example updated based on the estimation of the image quality metric $E_H$ and on the target level $M_H$.

Similarly, in an operation 606' (UPDATE), the parameter $P_L$ is for example updated based on the estimation of the image quality metric $E_L$ and on the target level $M_L$.

In some embodiments, updating the parameters in the operations 606 and 606' involves the use of a look-up table. Furthermore, in some embodiments, updating the parameters involves forcing the parameters $P_L$ and $P_H$ to be different from each other, with $P_H > P_L$. In some embodiments, $M_H$ and $M_L$ may be identical.

In an operation 607 (ARBITER), inference results $Z_{1 \ldots N}$ for the regions $R_{1 \ldots N}$ are for example generated based on the inference results $Z_{H,1 \ldots N}$ and corresponding distances $D_{H,1 \ldots N}$ and on the inference results $Z_{L,1 \ldots N}$ and corresponding distances $D_{L,1 \ldots N}$.

In some cases, the image processing circuit 104 is configured to only output the frame $F_H$ and/or $F_L$ in the case of an object detection or other form of significant inference result concerning one of these frames. In such a case, the operation 607 for example involves comparing each of the inference results $Z_{1 \ldots N}$ to a detection threshold $th_d$, and if $Z_i > th_d$, the image processing circuit 104 is configured to output the frame $F_H$ and/or $F_L$ in addition to the inference results $Z_{L,1 \ldots N}$.

Figure 7:
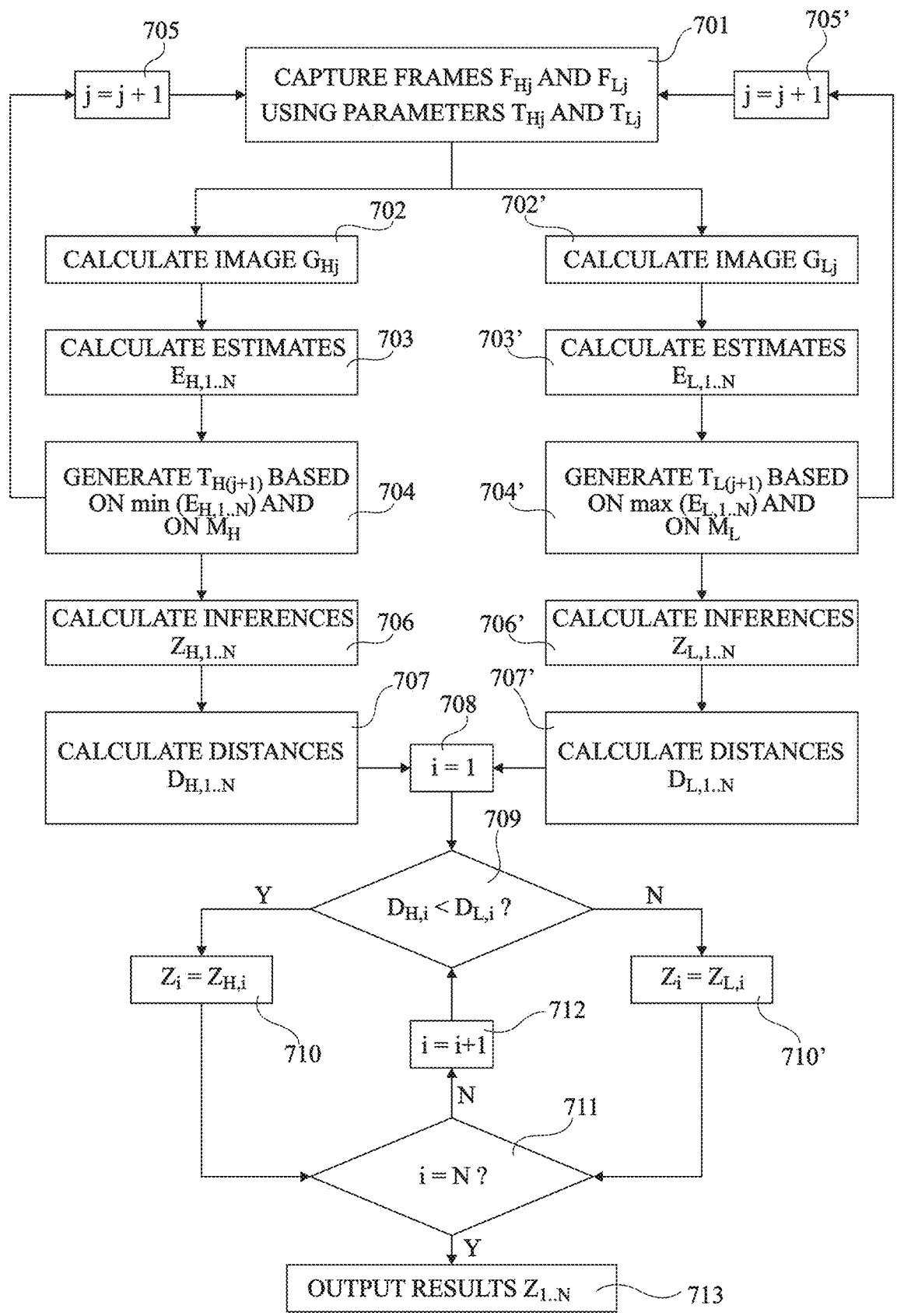
FIG. 7 is a flow diagram illustrating the operations of FIG. 6 in more detail.

FIG. 7 is a flow diagram illustrating some of the operations of FIG. 6 in more detail according to an example embodiment according to which the image capture parameters $P_H$ and $P_L$ are exposure times $T_H$ and $T_L$, where $T_H > T_L$. In such a case, the relatively high exposure time $T_H$ permits low light and/or low contrast areas of the image scene to be captured well, while the relatively low exposure time $T_L$ permits to reduce the over-exposure in areas of high light and/or high contrast. Indeed, certain image scenes may have a relatively high intra-scene dynamic range, which would require a relatively high number of bits per pixel to capture correctly. Such a high intra-scene dynamic range is particularly present in active illumination systems, such as where the scene is lit using near-infrared LEDs (light-emitting diodes), and an infrared filter is placed in front of the image sensor. Indeed, in such a case, the intensity of the reflected light from an object relatively close to the image sensor will be in the order of the inverse of the square of the distance of the object. A similar high intra-scene dynamic range can also occur with passive illumination, if for example the image is captured through a window. By capturing frames having long and short exposure times, a high dynamic range is present in the combination of images.

An operation 701 of FIG. 7 corresponds to the operations 602 and 602' of FIG. 6, in which frames $F_{Hj}$ and $F_{Lj}$ are captured based on image capture parameters $T_{Hj}$ and $T_{Lj}$ respectively.

In an operation 702 (CALCULATE IMAGE $G_{Hj}$), tone-mapping and resolution reduction is used to convert the frame $F_{Hj}$ into an image $G_{Hj}$, which for example uses a $\log_2$ representation of each pixel of the image. For example, the binary code representing the value of each pixel is converted into a representation based on $\log_2$ conversion through a Maximum Significant Bit position operator, e.g. 001XXXXX→101(5) or 00001XXX→011(3). For instance, an 8-bit coded pixel values is thus encoded with 3 bits.

Similarly, in an operation 702' (CALCULATE IMAGE $G_{Lj}$), tone-mapping and resolution reduction is used to generate an image $G_{Lj}$, in a similar manner to the generation of the image $G_{Hj}$.

In an operation 703 (CALCULATE ESTIMATES $E_{H,1 \ldots N}$), the estimates $E_{H,1 \ldots N}$ of operations 603-1 to 603-N are for example generated based on the image $G_{Hj}$. For example, the estimate of the image quality for a region $R_i$ of the frame is calculated based on the sum of the pixels of the region $R_i$ in the image $G_{Hj}$, and keeping only a certain number of the highest significant bits. For example, the calculation is represented by the following equation:

$$E_{H,i} = \sum_{pix \in Ri} \frac{G_H}{2^b} \qquad \text{[Math 1]}$$

where b is an integer representing the number of bits that is removed from the result of the sum. As one example, the sum is calculated using 12 bits, the 9 least significant bits are removed (b=9), and thus a 3-bit value remains.

Similarly, in an operation 703' (CALCULATE ESTIMATES $E_{L,1 \ldots N}$), the estimates $E_{L,1 \ldots N}$ of operations 603-1' to 603-N' are for example generated based on the image $G_{Lj}$. For example, the estimate of the image quality for a region $R_i$ of the frame is calculated based on the sum of the pixels of the region $R_i$ in the image $G_{Lj}$, for example as represented by the following equation:

$$E_{L,i} = \sum_{pix \in Ri} \frac{G_L}{2^b} \quad \text{[Math 2]}$$

An operation 704 (GENERATE $T_{H,(j+1)}$ BASED ON min($E_{H,1 \ldots N}$) AND ON $M_H$) of FIG. 7 corresponds to the operation 606 of FIG. 6 in which the parameters are updated. In the example of FIG. 7, the parameter $T_{H,(j+1)}$ to be used for capturing a next frame is for example calculated based on a minimum estimate among the estimates $E_{H,1 \ldots N}$. For example, the parameter $T_{H(j+1)}$ is calculated based on the following equation:

$$T_{H,(j+1)} = aq^{k_H} \quad \text{[Math 3]}$$

where $k_H$ is an exposure time index, a is a minimum integration time, and q is for example the ratio between two successive integration times for successive indexes $k_H$. For example, a simplification can be achieved if we set $q=2^{2^b/P}$, where p is the number of pixels in the region $R_i$. For example, in the case that b=9, for a pixel region of 32 by 32 pixels (p=1024), q=√2. The index $k_H$ is for example updated as follows:

$$k_{H,(j+1)} = k_{H,j} + M_H - \min(E_{H,i})$$

In some embodiments, the parameter $T_{H(j+1)}$ is updated based on the variable $k_H$ using a look-up table. Furthermore, in some embodiments, in order to speed up the convergence time, in the case that the estimate $E_{H,i}$ is the result of a linear operation, thus without a tone-mapping stage, such as a mean value, the mechanism for updating the index $k_H$ could be based on a feedback control. For example, the index $k_{H,(j+1)}$ could be updated based on the equation $k_{H,(j+1)} = k_{H,j} + [\log_q(M_H) - \log_q(E_H)]$, where [.] is a function bringing the result into the integer domain, such as a rounding operation, threshold function, etc.

Similarly, an operation 704' (GENERATE $T_{L,(j+1)}$ BASED ON max($E_{L,1 \ldots N}$) AND ON $M_L$) of FIG. 7 corresponds to the operation 606' of FIG. 6 in which the parameters are updated. In the example of FIG. 7, the parameter $T_{L,(j+1)}$ to be used for capturing a next frame is for example calculated based on a maximum estimate among the estimates $E_{L,1 \ldots N}$. For example, the parameter $T_{L(j+1)}$ is calculated based on the following equation:

$$T_{L,(j+1)} = aq^{k_L} \quad \text{[Math 5]}$$

where $k_L$ is an exposure time index, a is the minimum integration time as before, and q is for example, as before, the ratio between two successive integration times for successive indexes $k_L$. The index $k_L$ is for example updated as follows:

$$k_{L,(j+1)} = k_{L,j} + M_L - \max(E_{L,i}) \quad \text{[Math 6]}$$

In some embodiments, the parameter $T_{L(j+1)}$ is updated based on the variable $k_L$ using a look-up table. Furthermore, in some embodiments, in order to speed up the convergence time, in the case that the estimate $E_{L,i}$ is the result of a linear operation, such as a mean value, the mechanism for updating the index $k_L$ could be based on a feedback control. For example, the index $k_{L,(j+1)}$ could be updated based on the equation $k_{L,(j+1)} = k_{L,j} + [\log_q(M_L) - \log_q(E_L)]$, where [.] is a function bringing the result into the integer domain, such as a rounding operation, threshold function, etc.

It will be apparent to those skilled in the art that the above example of how to update the parameters based on the target levels $M_H$ and $M_L$ and based on the estimates $E_{H,1 \ldots N}$ and $E_{L,1 \ldots N}$ is merely one example, and that different calculations could be used.

For example, in some embodiments, the $T_H$ and $T_L$ are modified in steps of fixed size $\Delta T$, equal for example to the smallest step size, such that the parameters are modified incrementally over many cycles. According to one example, $T_{H(j+1)} = T_j + \Delta T$ if $E_H < M_H$, or $T_{H(j+1)} = T_j - \Delta T$ if $E_H > M_H$, and $T_{L(j+1)} = T_j + \Delta T$ if $E_L < M_L$, or $T_{L(j+1)} = T_j - \Delta T$ if $E_L > M_L$.

After operations 704 and 704', further images are for example captured using the updated parameters $T_{H,(j+1)}$ and $T_{L,(j+1)}$. For example, in operations 705 and 705' after the operations 704 and 704' respectively, j is incremented, and then the method returns to the operation 701 in which the new frames are captured using the updated parameters. Furthermore, also after operations 704 and 704', an inference result is for example generated for each region $R_{1 \ldots N}$ of the frames in operations 706 to 713, as will now be described in more detail.

The operation 706 (CALCULATE INFERENCES $Z_{H,1 \ldots N}$) corresponds to the inference calculation of the operations 603-1 to 603-N of FIG. 6, in which the inference results $Z_{H,1 \ldots N}$ are generated for the regions $R_{1 \ldots N}$ of the frame $F_{Hj}$.

Similarly, the operation 706' (CALCULATE INFERENCES $Z_{L,1 \ldots N}$) corresponds to the inference calculation of the operations 603-1' to 603-N' of FIG. 6, in which the inference results $Z_{L,1 \ldots N}$ are generated for the regions $R_{1 \ldots N}$ of the frame $F_{Lj}$.

The operation 707 (CALCULATE DISTANCES $D_{H,1 \ldots N}$) corresponds to the distance calculation of operations 604-1 to 604-N of FIG. 6, in which the distances $D_{H,1 \ldots N}$ are calculated.

Similarly, the operation 707' (CALCULATE DISTANCES $D_{L,1 \ldots N}$) corresponds to the distance calculation of operations 604-1' to 604-N' of FIG. 6, in which the distances $D_{L,1 \ldots N}$ are calculated.

After operations 707 and 707', arbitration is performed in operations 708 to 713, corresponding to the operation 607 of FIG. 6. For example, in the operation 708, a variable i is set to 1, and in an operation 709, the distances $D_{H,i}$ and $D_{L,i}$ are compared. If $D_{H,i} < D_{L,i}$ (branch Y), then in an operation 710, the inference result $Z_i$ is set to the value $Z_{H,i}$ calculated for the region $R_i$ of the frame $F_{Hj}$. If not, (branch N), then in an operation 710', the inference result $Z_i$ is set to the value $Z_{L,i}$ calculated for the region $R_i$ of the frame $F_{Lj}$. After operations 710 and 710', it is for example determined in an operation 711 whether i is equal to the number N of regions. If not, in an operation 712, i is incremented, and then the method returns to operation 709. Once i is equal to N in operation 711, the output results $Z_{1 \ldots N}$ are outputted in an operation 713 (OUTPUT RESULTS $Z_{1 \ldots N}$).

It will be noted that updating the parameter $T_H$ based on the minimum region-based estimator $E_H$ and the parameter $T_L$ based on maximum region-based estimator $E_L$ has the advantage of intrinsically leading to different parameter values.

While FIG. 7 illustrates an example in which the image capture parameters $P_H$ and $P_L$ are exposure times, it will be apparent to those skilled in the art how the method of FIG. 7 could be adapted to other types of image capture parameters.

An advantage of the embodiments described herein is that an inference operation can be applied to a best case of two different captured images based on a relatively simple distance calculation.

Further, in the case that the image capture parameters $P_H$ and $P_L$ are exposure times $T_H$ and $T_L$, an advantage is that the embodiments described herein provide a solution of relatively low complexity for performing inference operations on low dynamic range images, leading to a performance close to the inference that would be performed on the same image but with a high dynamic range. Indeed, while an alternative solution could be to capture high dynamic range images, or to merge two low dynamic range images in order to generate a high dynamic range image, processing such images would be very complex. Indeed, the inference algorithm should be designed or trained to process such images, and thus the size and complexity of the inference algorithm would be very high in view of the high number of bits. By applying the same inference algorithm to either or both of two frames captured with difference image capture parameters, and selecting the inference result based on the region of the two frames that best matches a target image quality, the inference algorithm remains relatively simple.

Various embodiments and variants have been described. Those skilled in the art will understand that certain features of these embodiments can be combined and other variants will readily occur to those skilled in the art. For example, it will be apparent to those skilled in the art that:

- while embodiments have been described in which the frames $F_H$ and $F_L$ are captured by the same image sensor, it would also be possible to capture the frames $F_H$ with one image sensor, and to capture the frames $F_L$ with another image sensor;
- the frames $F_H$ and $F_L$ that are processed as a pair are for example images captured at relatively close time instances, but these frames are not necessarily sequential frames from the image sensor;
- in some embodiments, in the case that the frames $F_H$ and $F_L$ have different integration times, it would be possible to capture the frames $F_L$ and $F_H$ sequentially without resetting the pixels of the image sensor between the frames. For example, the frame $F_L$ is read in a non-destructive manner while the pixels continue to integrate, and then the frame $F_H$ is captured after a further integration period;
- while the estimates $E_H$ and $E_L$ have been described as being based on the minimum among the estimates $E_{H,1 \ldots N}$ and the maximum among the estimates $E_{L,1 \ldots N}$, in alternative embodiments the estimates $E_H$ and $E_L$ could be calculated based on more than one of the regional estimates $E_{H,1 \ldots N}$ and $E_{L,1 \ldots N}$ respectively;
- while embodiments have been described in which there are two types of frames $F_L$ and $F_H$ that are captured, it would also be possible to apply the teaching described herein to more than two types of frames, an additional medium frame $F_M$ for example being added, captured based on a medium parameter $P_M$.

Finally, the practical implementation of the embodiments and variants described herein is within the capabilities of those skilled in the art based on the functional description provided hereinabove.

What is claimed is:

1. A method of performing an inference operation comprising:
    capturing a first image $F_H$ using a first value $P_H$ of an image capture parameter;
    capturing a second image $F_L$ using a second value $P_L$, lower than the first value, of the image capture parameter;
    generating, by an image processing circuit, for a first region $R_1$ of the first image, a first estimate $E_{H,i}$ of an image quality metric, wherein the image quality metric is dependent on the value of the image capture parameter;
    calculating, by the image processing circuit, a first distance $D_{H,1}$ between the first estimate $E_{H,i}$ and a first target level $M_H$;
    generating, by the image processing circuit, for a first region $R_1$ of the second image, a second estimate $E_{L,i}$ of the image quality metric, wherein the first regions of the first and second images are spatially corresponding regions;
    calculating, by the image processing circuit, a second distance $D_{L,1}$ between the second estimate $E_{L,i}$ and a second target level $M_L$; and
    supplying, by the image processing circuit, a result $Z_L$ of the inference operation performed on the first region $R_1$ of either the first or second image selected based on the first and second distances.

2. The method of claim 1, further comprising:
    calculating, by the image processing circuit, a first new value $P_{H(j+1)}$ of the image capture parameter based on at least the first estimate $E_{H,i}$;
    capturing a third image $F_{H(j+1)}$ using the first new value $P_{H(j+1)}$ of the image capture parameter;
    calculating, by the image processing circuit, a second new value $P_{L(j+1)}$ of the image capture parameter based on at least the second estimate $E_{L,i}$; and
    capturing a fourth image $F_{L(j+1)}$ using the second new value $P_{L(j+1)}$ of the image capture parameter.

3. The method of claim 2, wherein the first new value $P_{H(j+1)}$ is further calculated based on the first target level $M_H$, and the second new value $P_{L(j+1)}$ is further calculated based on the second target level $M_L$.

4. The method of claim 1, further comprising:
    performing the inference operation on the first region $R_1$ of the first image $F_H$ to generate a first inference result $Z_{H,1}$; and
    performing the inference operation on the first region $R_1$ of the second image $F_H$ to generate a second inference result $Z_{L,1}$, wherein supplying the result of the inference operation comprises selecting the first inference result or the second inference result based in the first and second distances $D_{H,1}$, $D_{L,1}$.

5. The method of claim 1, further comprising:
    comparing, by the image processing circuit, the first and second distances $D_{H,1}$, $D_{L,1}$;
    if the first distance is lower than the second distance, performing the inference operation on the first region $R_1$ of the first image $F_H$ to generate a first inference result $Z_{H,1}$, and supplying the first inference result $Z_{H,1}$ as the result $Z_L$ of the inference operation; and
    if the second distance is lower than the first distance, performing the inference operation on the first region $R_L$ of the second image $F_L$ to generate a second inference result $Z_{L,1}$, and supplying the second inference result $Z_{L,1}$ as the result $Z_i$ of the inference operation.

6. The method of claim 1, further comprising:
    generating, by the image processing circuit, for a second region $R_2$ of the first image, a third estimate $E_{H,2}$ of the image quality metric;
    calculating, by the image processing circuit, a further first distance $D_{H,2}$ between the third estimate $E_{H,2}$ and the first target level $M_H$;
    generating, by the image processing circuit, for the second region $R_2$ of the first image, a fourth estimate $E_{L,2}$ of the image quality metric, wherein the second regions $R_2$ of the first and second images are spatially corresponding regions;

calculating, by the image processing circuit, a further second distance $D_{L,2}$ between the fourth estimate $E_{L,2}$ and the second target level $M_L$; and supplying a result of the inference operation performed on the second region of either the first or second image selected based on the first and second distances.

7. The method of claim 6, further comprising:

calculating, by the image processing circuit, a first new value ($F_{H(j+1)}$) of the image capture parameter based on at least the first estimate ($E_{H,i}$);

capturing a third image ($F_{H(j+1)}$) using the first new value $P_{H(j+1)}$) of the image capture parameter;

calculating, by the image processing circuit, a second new value ($P_{L(j+1)}$) of the image capture parameter based on at least the second estimate ($E_{L,i}$); and capturing a fourth image ($F_{L(j+1)}$) using the second new value ($P_{L(j+1)}$) of the image capture parameter, wherein the first new value $P_{H(j+1)}$ of the image capture parameter is based on a minimum $\min(E_{H,i})$ of at least the first and third estimates $E_{H,i}$, and the second new value $P_{L(j+1)}$ of the image capture parameter is based on a maximum $\max(E_{L,i})$; of at least the second and fourth estimates $E_{L,i}$.

8. The method of claim 1, wherein the image capture parameter is an exposure time.

9. The method of claim 1, wherein the first and second estimates $E_{H,i}, E_{L,i}$ of the image quality metric are average pixel values of the pixels of the first region $R_1$.

10. The method of claim 1, wherein the result $Z_i$ of the inference operation indicates a confidence level of a detection of an object in the first region.

11. The method of claim 10, further comprising comparing, by the image processing circuit, the result $Z_i$ of the inference operation with a threshold value $th_d$, and outputting the first and/or second image $F_H, F_L$ if the threshold value is exceeded.

12. An imaging device 100 comprising:

one or more image sensors configured to capture a first image $F_H$ using a first value $P_H$ of an image capture parameter and a second image $F_L$ using a second value $P_L$, lower than the first value, of the image capture parameter; and an image processing circuit configured to:

generate, for a first region $R_1$ of the first image, a first estimate $E_{H,i}$ of an image quality metric, wherein the image quality metric is dependent on the value of the image capture parameter;

calculate a first distance $D_{H,1}$ between the first estimate $E_{H,i}$ and a first target level $M_H$; generate, for a first region $R_1$ of the second image, a second estimate $E_{L,i}$ of the image quality metric, wherein the first regions of the first and second images are spatially corresponding regions;

calculate a second distance $D_{L,1}$ between the second estimate $E_{L,i}$ and a second target level $M_L$; and supply a result $Z_i$ of the inference operation performed on the first region $R_1$ of either the first or second image selected based on the first and second distances.

13. The imaging device of claim 12, wherein the one or more image sensors and the image processing circuit are in a same integrated circuit chip.

14. The imaging device of claim 12, wherein the image processing circuit is further configured to:

generate, for a second region $R_2$ of the first image, a third estimate $E_{H,2}$ of the image quality metric;

calculate a further first distance $D_{H,2}$ between the third estimate $E_{H,2}$ and the first target level $M_H$;

generate, for the second region $R_2$ of the first image, a fourth estimate $E_{L,2}$ of the image quality metric, wherein the second regions $R_2$ of the first and second images are spatially corresponding regions;

calculate a further second distance $D_{L,2}$ between the fourth estimate $E_{L,2}$ and the second target level $M_L$; and supply a result of the inference operation performed on the second region of either the first or second image selected based on the first and second distances.

15. The imaging device of claim 14, wherein the image processing circuit is further configured to:

calculate a first new value $P_{H(j+1)}$ of the image capture parameter based on a minimum $\min(E_{H,L})$ of at least the first and third estimates $E_{H,i}$;

capture a third image $F_{H(j+1)}$ using the first new value $P_{H(j+1)}$ of the image capture parameter;

calculate a second new value $P_{L(j+1)}$ of the image capture parameter based on a maximum $\max(E_{L,i})$ of at least the second and fourth estimates $E_{L,i}$; and capture a fourth image $F_{L(j+1)}$ using the second new value $P_{L(j+1)}$ of the image capture parameter.

* * * * *